US008854442B2

(12) United States Patent
Rodriguez et al.

(10) Patent No.: US 8,854,442 B2
(45) Date of Patent: *Oct. 7, 2014

(54) RETAINER FOR ELECTRONIC MAGNIFICATION DEVICE

(75) Inventors: Carlos Rodriguez, Palm Harbor, FL (US); Bradley S. Davis, Largo, FL (US); Mathieu Turpault, Berwyn, PA (US); Mathieu Zastawny, Philadelphia, PA (US)

(73) Assignee: Freedom Scientific, Inc., St. Petersburg, FL (US)

( * ) Notice: Subject to any disclaimer, the term of this patent is extended or adjusted under 35 U.S.C. 154(b) by 927 days.

This patent is subject to a terminal disclaimer.

(21) Appl. No.: 13/013,215

(22) Filed: Jan. 25, 2011

(65) Prior Publication Data

US 2011/0141256 A1     Jun. 16, 2011

Related U.S. Application Data

(63) Continuation-in-part of application No. 12/900,224, filed on Oct. 7, 2010, which is a continuation-in-part of application No. 11/379,327, filed on Apr. 19, 2006, now Pat. No. 7,929,013.

(60) Provisional application No. 60/766,783, filed on Feb. 10, 2006.

(51) Int. Cl.
| | |
|---|---|
| *H04N 7/18* | (2006.01) |
| *H04N 9/47* | (2006.01) |
| *H04N 1/195* | (2006.01) |
| *G02B 27/02* | (2006.01) |
| *G03B 27/32* | (2006.01) |
| *G06F 1/16* | (2006.01) |
| *H04N 5/225* | (2006.01) |
| *G03B 17/48* | (2006.01) |

(52) U.S. Cl.
CPC .......... *G02B 27/026* (2013.01); *H04N 1/19594* (2013.01); *H04N 2201/0436* (2013.01); *G03B 27/323* (2013.01); *H04N 2201/043* (2013.01); *G06F 1/1607* (2013.01); *H04N 5/2251* (2013.01); *G06F 1/1601* (2013.01); *G03B 17/48* (2013.01); *H04N 1/195* (2013.01)
USPC ........................................................ 348/63

(58) Field of Classification Search
CPC .................. H04N 2201/0436; H04N 1/00129; G06F 2203/04805; G09B 21/008; G09B 27/027
USPC ........................................................ 348/63
See application file for complete search history.

(56) References Cited

U.S. PATENT DOCUMENTS

| | | |
|---|---|---|
| D201,771 S | 7/1965 | Regal |
| 3,194,223 A | 7/1965 | Mantzel |

(Continued)

FOREIGN PATENT DOCUMENTS

| | | |
|---|---|---|
| EP | 1 524 836 | 4/2005 |
| GB | 2 373 662 | 9/2002 |
| WO | 2005/101349 | 10/2005 |

OTHER PUBLICATIONS

Optelec, Tieman Group, ClearView Flex User Manual, Jun. 2004 V1.0 (60 pages).

(Continued)

*Primary Examiner* — Andy Rao
*Assistant Examiner* — Jared Walker
(74) *Attorney, Agent, or Firm* — GrayRobinson, P.A.; Michael J. Colitz, III

(57) ABSTRACT

Disclosed is a magnification device for use by blind and/or low vision individuals. The device includes an X-Y table upon which an item to be magnified can be placed. A stationary camera arm and a pivotal monitor arm are oriented over the X-Y table. The monitor arm includes a video monitor pivotally mounted at its distal end. The camera arm also includes two laterally disposed lighting arms. A series of controls are provided along a lower edge of the monitor via a mounting bracket.

9 Claims, 19 Drawing Sheets

(56) References Cited

U.S. PATENT DOCUMENTS

| | | | |
|---|---|---|---|
| 3,521,949 A | 7/1970 | Karow et al. | |
| 3,816,646 A | 6/1974 | Cinque | |
| 3,997,258 A | 12/1976 | Omi | |
| 4,440,457 A | 4/1984 | Fogelman et al. | |
| 4,928,170 A | 5/1990 | Soloveychik | |
| D345,968 S | 4/1994 | Bruce et al. | |
| D387,080 S | 12/1997 | Miyazawa | |
| D392,303 S | 3/1998 | Hern | |
| 5,852,654 A | 12/1998 | Song | |
| 6,064,426 A * | 5/2000 | Waterman | 348/63 |
| D428,415 S | 7/2000 | Shibata | |
| 6,247,085 B1 | 6/2001 | Younger | |
| 6,300,975 B1 * | 10/2001 | Yamane | 348/63 |
| 6,403,968 B1 | 6/2002 | Hazaki et al. | |
| 6,783,105 B2 | 8/2004 | Oddsen, Jr. | |
| 6,791,600 B1 | 9/2004 | Chan | |
| D559,298 S | 1/2008 | Sukenari et al. | |
| D614,220 S | 4/2010 | Goldenberg | |
| 7,701,481 B2 | 4/2010 | Mizukami et al. | |
| D631,903 S | 2/2011 | Sugiyama | |
| 7,929,013 B2 | 4/2011 | Goldenberg et al. | |
| 2002/0027358 A1 | 3/2002 | Peppers | |
| 2002/0144422 A1 | 10/2002 | Suhara et al. | |
| 2003/0060270 A1 | 3/2003 | Binkley et al. | |
| 2004/0036663 A1 | 2/2004 | Bevers et al. | |
| 2004/0189847 A1 | 9/2004 | Hogrebe et al. | |
| 2005/0122396 A1 * | 6/2005 | Mizukami et al. | 348/63 |
| 2005/0162512 A1 | 7/2005 | Seakins | |
| 2005/0162722 A1 | 7/2005 | Harris | |
| 2005/0179618 A1 | 8/2005 | Oh | |
| 2005/0201744 A1 | 9/2005 | DeSorbo et al. | |
| 2006/0158427 A1 | 7/2006 | Goldenberg et al. | |
| 2006/0203093 A1 * | 9/2006 | Trulaske | 348/156 |
| 2007/0292026 A1 | 12/2007 | Reznik et al. | |
| 2009/0059038 A1 | 3/2009 | Seakins et al. | |
| 2011/0074940 A1 | 3/2011 | Goldenberg et al. | |
| 2011/0194011 A1 | 8/2011 | Goldenberg et al. | |

OTHER PUBLICATIONS

Optelec Tieman Group, ClearView Flex User Manual, Dec. 2005, pp. 1-16.

* cited by examiner

RETAINER FOR ELECTRONIC MAGNIFICATION DEVICE

RELATED APPLICATION DATA

This application claims priority to and is a continuation-in-part of co-pending utility application Ser. No. 12/900,224 filed on Oct. 7, 2010 and entitled "Electronic Magnification Device." the '224 application, in turn, claims priority to and is a continuation-in-part of application Ser. No. 11/379,327 filed on Apr. 19, 2006 and entitled "Desktop Electronic Magnifier." Both these applications additionally claim priority to provisional application Ser. No. 60/766,783, filed on Feb. 10, 2006. The contents of all these applications are fully incorporated herein for all purposes.

BACKGROUND OF THE INVENTION

1. Field of the Invention

This invention relates to a magnification device. More particularly, the invention relates to a retainer for an electronic magnifier.

2. Description of the Background Art

People with impaired vision have difficulty reading books, perceiving small objects, or seeing fine detail. Magnifying glasses have long been used to enable the perception of small details which may otherwise be below the unaided resolution of an individual. Desktop electronic magnifiers, sometimes referred to as closed circuit television devices (cctv), have now largely supplanted magnifying glasses. These devices employ a camera having CMOS technology for generating an enlarged or magnified image of the object. The user is then able to view an enlarged image of the object as it is displayed on a monitor.

An example of one such desktop electronic magnifier is disclosed in U.S. Pub. No. U.S. 2006/0203093 to Trulaske. Trulaske discloses a closed circuit video magnification system, including a camera that is mounted over a table by way of an adjustable link. Trulaske also includes a series of controls that are integral to the associated monitor.

Currently available desktop electronic magnifiers, such as Trulaske, have a number of limitations. One limitation is that existing magnifiers do not provide sufficient lighting for cameras having larger fields of view. As a result, existing magnifiers must utilize lower resolution cameras. Another drawback is that with existing magnifiers there is interference between the camera and monitor. This results in movement of the camera, which is problematic as the camera must regain focus and be reset to the selected magnification level. This interrupts viewing and results in periods of blurriness. Still yet another drawback is that existing magnifiers use dedicated monitors, often with integrated and specialized controls. This prevents the magnifier from being used with conventional displays and further makes repair and/or maintenance problematic.

A need therefore exists for an electronic magnifier with improved lighting to accommodate larger fields of view. A need also exists for an electronic magnifier without interference between the monitor and the associated camera. It is an objective of the present electronic magnifier to fulfill these and other needs.

SUMMARY OF THE INVENTION

An advantage provided by the magnifier of the present disclosure is the ability to accommodate wider fields of view and higher resolutions via an improved lighting arrangement.

Another advantage is realized by providing light sources that are mounted on a laterally disposed mounting arm.

The disclosed magnifier camera provides yet another advantage by providing two independent mounting arms for the monitor and associated camera.

A further advantage is realized by providing a stationary camera and an adjustable monitor.

Another advantage is achieved by removably securing the monitor via a mounting bracket to thereby permit the monitor to be easily replaced and/or repaired.

Various embodiments of the invention may have none, some, or all of these advantages. Other technical advantages of the present invention will be readily apparent to one skilled in the art.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

PARTS LIST

Figure 1:
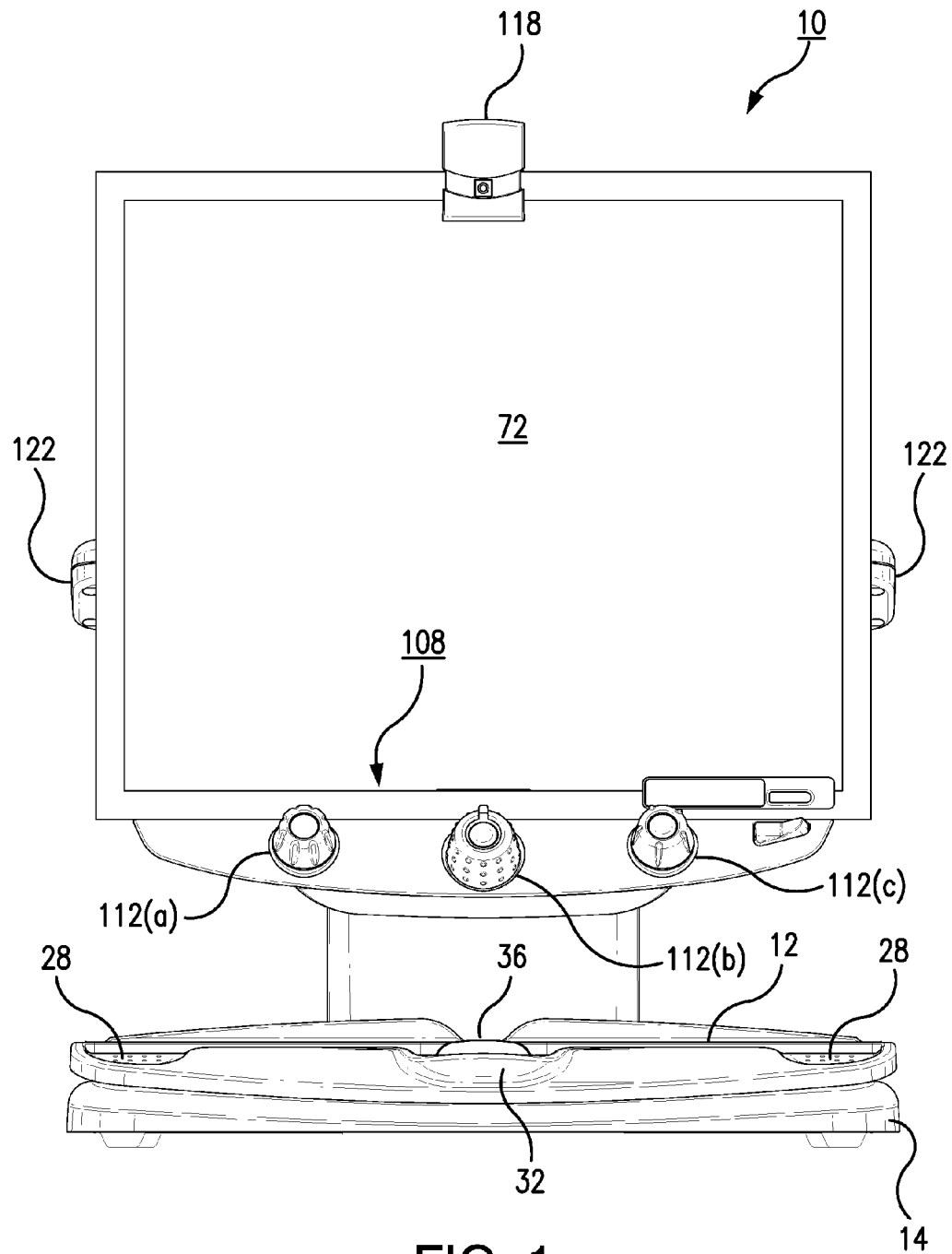
FIG. 1 is a front elevational view of the magnification device of the present disclosure.

| | | | |
|---|---|---|---|
| 10 Device | 42 Camera Arm-Proximal End | 74 Monitor Arm | 106 Rotatable Bearing |
| 12 X-Y Table | 44 Camera Arm-Distal End | 76 Monitor Bracket | 108 Control Panel |
| 14 Base | 46 Camera Arm-Intermediate Extent | 78 Monitor Arm-Proximal End | 112 (a), (b), (c) Controls |
| 16 Forward Edge of Table/Base | 48 Camera Arm-Forward Surface | 82 Monitor Arm-Distal End | 114 Rotatable Outer Knob |
| 18 Rearward Edge of Table/Base | 52 Camera Arm-Rearward Surface | 84 Monitor Arm-Intermediate Extent | 116 Push Button |
| 22 Side Edges of Table/Base | 54 Access Opening | 86 Hinge Assembly | 118 Self View Camera |
| 24 First Channels in Base | 56 Channel in Camera Arm | 88 Swivel Mount for Monitor | 120 Wheels on Control Panel |
| 26 Second Channels in Base | 58 Camera Housing | 92 Balancing Spring | 122 Lighting Arm |
| 28 Grips for X-Y Table | 62 Camera Housing-Forward End | 94 Proximal End Cap | 124 Lights |
| 32 Lock for X-Y Table | 64 Camera Housing-Rearward End | 96 Distal End Cap | 126 SD Card Slot |
| 34 Raised Back Edge of Table | 66 Camera Housing-Aperture Opening | 98 Mounting Screw for Distal End Cap | |
| 36 Channel in Table | 68 Camera | 102 Tensioning Screw | |
| 38 Camera Arm | 72 Monitor | 104 Linkage | |

DETAILED DESCRIPTION OF THE PREFERRED EMBODIMENT

This disclosure relates to a magnification device for use by blind and/or low vision individuals. The device includes an X-Y table upon which an item to be magnified can be placed. A stationary camera arm and a pivotal monitor arm are oriented over the X-Y table. The monitor arm includes a video monitor pivotally mounted at its distal end. The camera arm also includes a laterally disposed lighting arm. A series of controls are provided along a lower edge of the monitor via a mounting bracket. The various details of the present disclosure, and the manner in which they interrelate, will be described in greater detail hereinafter.

Device 10 includes an X-Y table 12 that is adjustably mounted to an underlying base 14. Both table 12 and base 14 are defined by forward and rearward edges (16 and 18, respectively) and a pair of side edges 22. Rubber or elastic feet may be positioned on the bottom surface of the base to avoid marring the supporting surface. Two pairs of channels are formed with the base. These channels include a first pair of channels 24 which extend between the side edges of base 14 and a second pair of channels 26 that extend between the forward and rearward edges of base 14. X-Y table 12 includes rails that fit into the channels (24 and 26) and thereby permit adjustment in the X and Y orientations.

X-Y table 12 also includes a forward edge with grip areas 28 for permitting the user to manipulate table with respect to base 14. Table 12 also includes a centrally disposed lock 32. Lock 32 has two orientations. In the first orientation, table 12 is fixed with respect to base 14; in the second orientation, the user can move table 12 in the X and Y orientations with respect to base 14.

Table 12 includes a number of features to allow items to be conveniently and safely positioned for viewing. For instance, a raised back edge 34 is included for preventing items from falling off the rearward edge 18 of table 12. A centrally disposed arcuate channel 36 is also included adjacent the back edge 18. Channel 36 is preferably formed as an indentation with the upper surface of table 12. Channel 36 allows cylindrical objects to be conveniently oriented on table 12 for inspection. Channel 36 is ideally suited for the secure placement of prescription pill bottles. This permits the bottles to be secured against rotation and properly oriented to permit magnification of relevant text. Although the depicted channel 36 preferred, other arrangements can likewise be employed. For instance, instead of an indented channel 36, upstanding ridges can be formed within surface of table 12. These ridges could be positioned at any location upon table and would similarly function to retain cylindrical objects.

The camera arm 38 of device 10 is described next. Arm 38 extends from, and is integral with, the rearward edge 18 of base 14. Camera arm 38 is defined by a proximal end 42, a distal end 44, and an intermediate extent 46 as well as forward and rearward surfaces (48 and 52, respectively). Although arm 38 is disclosed as being arcuate, it can likewise be formed from other shapes and/or configurations. The proximal end 42 extends upwardly from the rearward edge 18 of base 14 and the distal end 44 extends over top of table 12. As noted in the figures, the distal most end curves downward to avoid interfering with the arm that supports the associated monitor. Camera arm further includes an access opening 54 within its intermediate extent 46.

This access opening 54 permits users to access the power outlets, electrical connectors, and computer ports associated with the camera positioned within an associated camera housing. The cabling coupled to the camera and through the access opening 54 can be routed through a channel 56 positioned within the rearward surface of camera arm 42. Cable clips, or other fastening mechanisms, can be positioned within channel 56 to allow a user to appropriately secure the cabling.

The camera housing 58 of the device is next described. The camera housing has a generally rectangular configuration with both forward and rearward ends (62 and 64, respectively). An aperture opening 66 is disposed on a bottom face of the camera housing. This opening is adapted for registration with the lens of a camera via a mirror supported within housing 58. The rearward end 64 of the housing is adapted to be received within access opening 54 of camera arm 38 and further secured by screws or fasteners. When properly oriented, camera housing 58 is secured to the distal end 44 of the camera arm upon its forward surface 48. The aperture opening 66 is also centrally oriented over table 14. This permits the associated camera to view and focus upon objects positioned upon the table. Camera 68 ideally has a resolution and field of view sufficient to view the entire surface of table 12. In the preferred embodiment, the resolution of camera 68 is 768 pixel columns by 494 pixel rows. The resolution, magnification, and position of camera 68 yields a much larger field of view than existing magnifiers. In the illustrated embodiment, the field of view is approximately 9.0 inches wide and 7.0 inches long. This, in turn, dramatically increases the number of objects that can be viewed with the magnifier.

Objects viewed by camera 68 are displayed upon the associated monitor 72. Monitor 72, in turn, is secured to a monitor arm 74 via a monitor bracket 76. Monitor arm 74 includes both a proximal end 78 and distal end 82 and an intermediate extent 84 therebetween. Proximal end 78 of monitor arm 74 is pivotally secured to the intermediate extent 46 of camera arm 38 via hinge assembly 86. Hinge assembly 86 permits camera arm 38 to both pivot and rotate with respect to the underlying camera arm 38. A pin 86(a) can be provided to lock arm against rotation. Hinge assembly 86 is preferably positioned at a location that is above access opening 54. The distal end 44 of camera arm 38 includes a swivel mount 88 to which the monitor bracket 76 is secured. Monitor, 72 in turn, is secured to monitor bracket 76 in a conventional fashion via removable fasteners.

A video cable, which in the preferred embodiment is an HDMI cable, extends from an HDMI output 68(a) on camera 68, through camera housing 58, through the inside of monitor arm 74 and to an input on monitor 72 to thereby provide a video feed from camera 68 to he monitor 72. By routing cables through arm 74, an uncluttered appearance is presented. Although an HDMI cable is preferred, other types of connections can be used, such as S-video cable, component cables, or VGA cables. Camera 68 also includes a USB output 68(b), which can be used to feed live video from camera 68 to a personal computer (PC). This would permit objects on table 12 to be viewed on the PC. Additionally, the PC can include software to replicate the functionality provided by controls 112 and 120. Camera 68 likewise includes a VGA input 68(c). This allows the output from a PC to be viewed on monitor 72 of the magnification device 10.

Additionally, the VGA input 68(c) can be used in conjunction with USB output 68(b) to permit side-by-side viewing of objects. Namely, objects on table 12 would be viewed by camera 68 and displayed on the PC monitor via the USB output 68(c) and cable. Again, the functionality of the control panel 108 could be replicated by software running on the PC. The software could add still yet other functionality to modify the displayed image. Thereafter, this image could be display on monitor 72 by routing a video cable between the PC and the VGA input 68(c). This would permit side by side viewing of the object via two monitors.

A counter balancing spring 92 is operatively mounted within monitor arm 74 and assists a user in raising or lowering monitor 72 and monitor arm 74. Spring 92 is mounted between proximal and distal end caps (94 and 96, respectively). The distal end cap 96 is threaded about a mounting screw 98. A tensioning screw 102 can be used to rotate mounting screw 98 and, thereby, position the distal end cap 96 to either compress or uncompress balancing screw 92. In this manner, tensioning screw 102 can be used to set the proper spring tension depending upon the size and weight of the attached monitor 72. The proximal end cap 94 is connected to a linkage 104 via a rotatable bearing 106. The opposite end of linkage 104 is pivotally connected to hinge assembly 86. The proximal end 78 of monitor arm 74 is likewise pivotally connected to hinge assembly 86 to thereby create a three bar linkage.

Figure 9A:
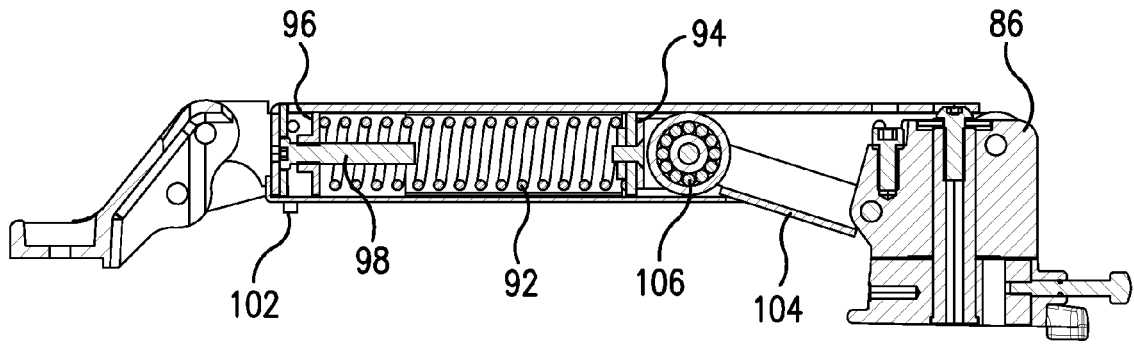
FIGS. 9a-9b are cross sectional views of the camera arm utilized in the present disclosure.
Figure 9B:
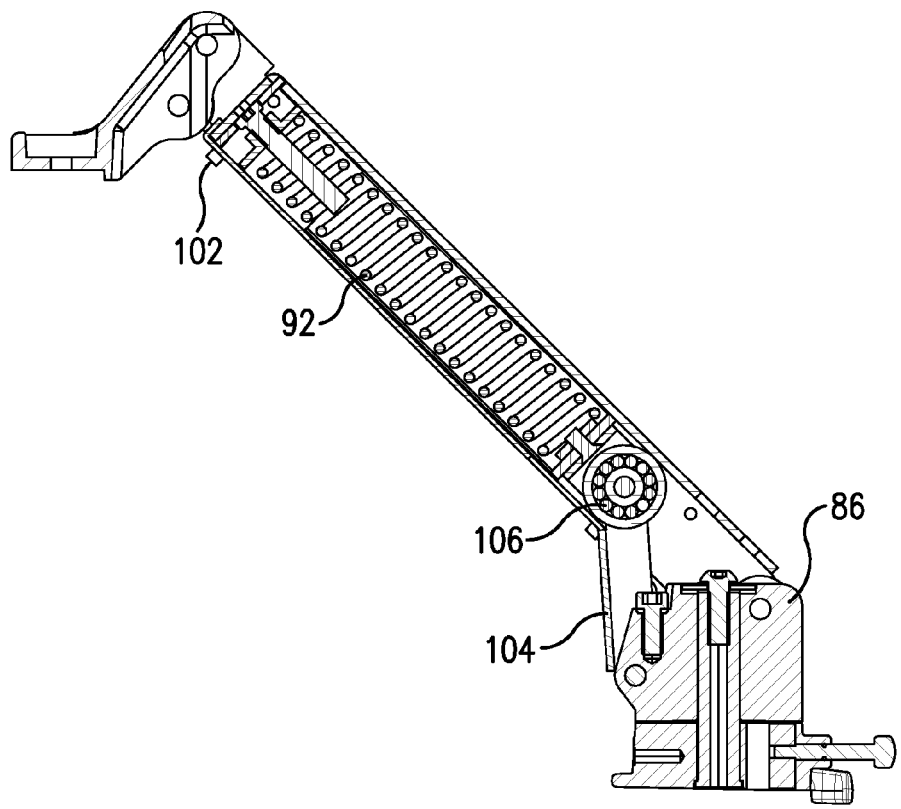
Figure 10:
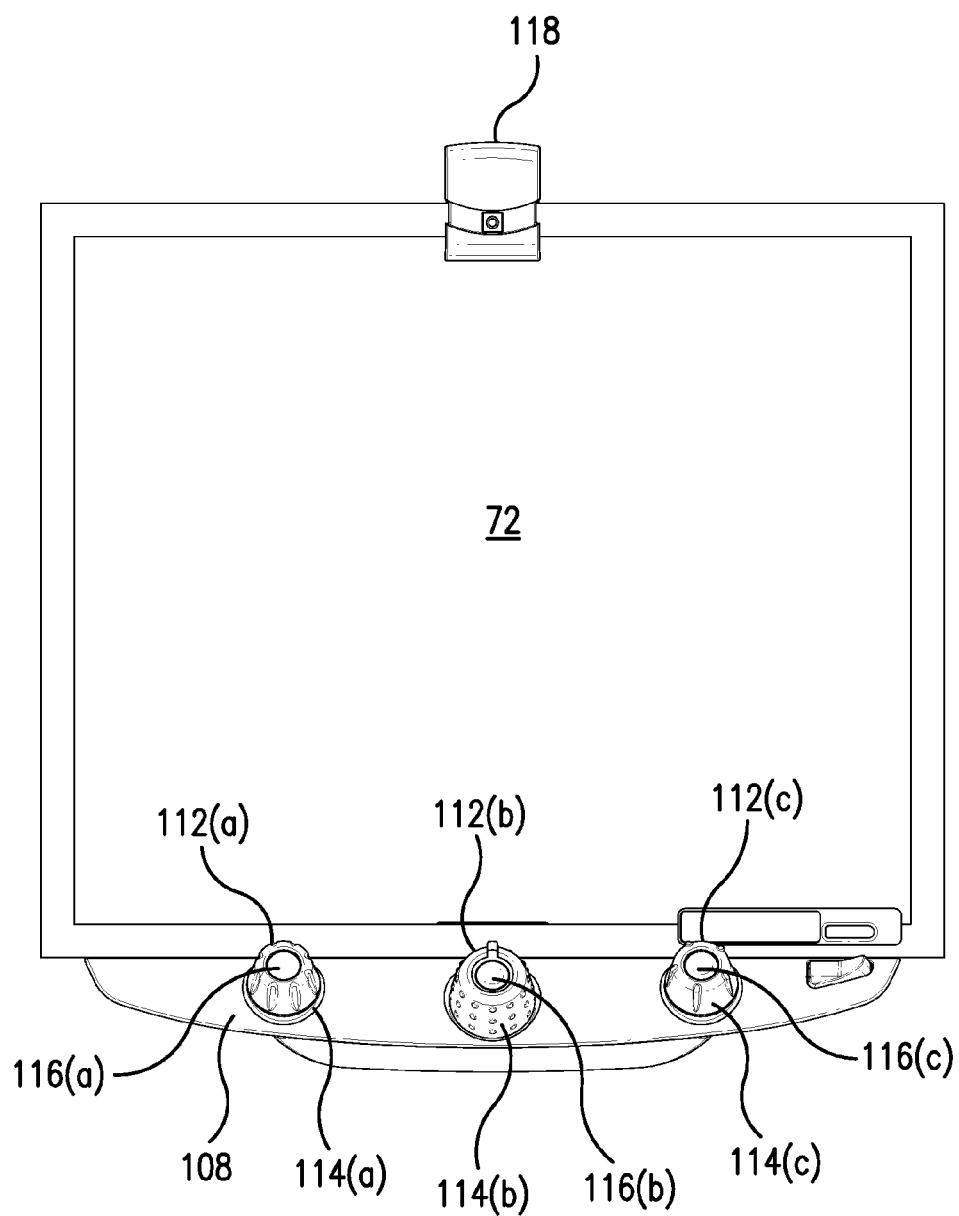
FIG. 10 is a detailed view of the controls and self-view camera employed in the present disclosure.
Figure 11:
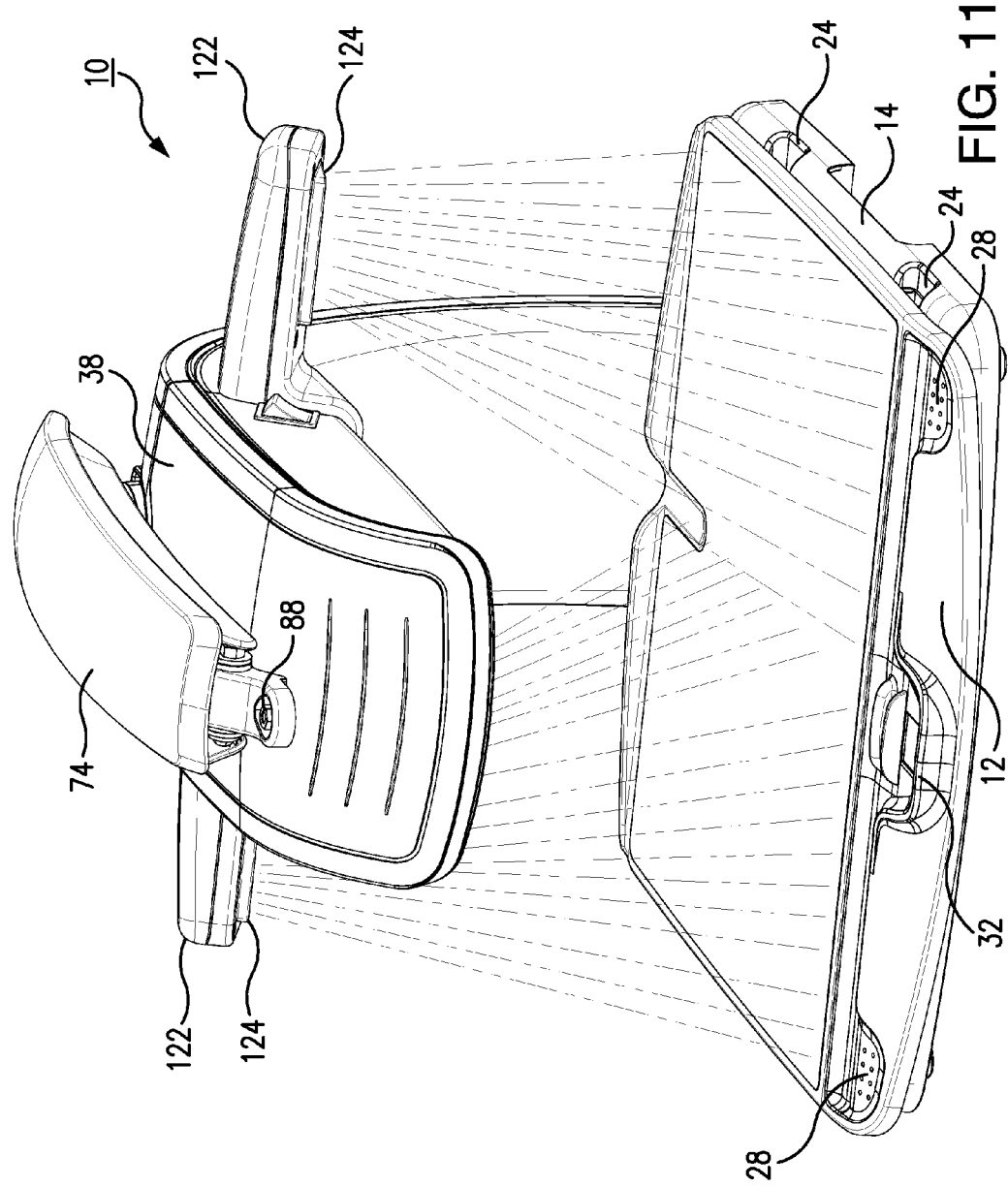
FIG. 11 is a detailed view showing the lighting arrangement of the present disclosure.
Figure 12:
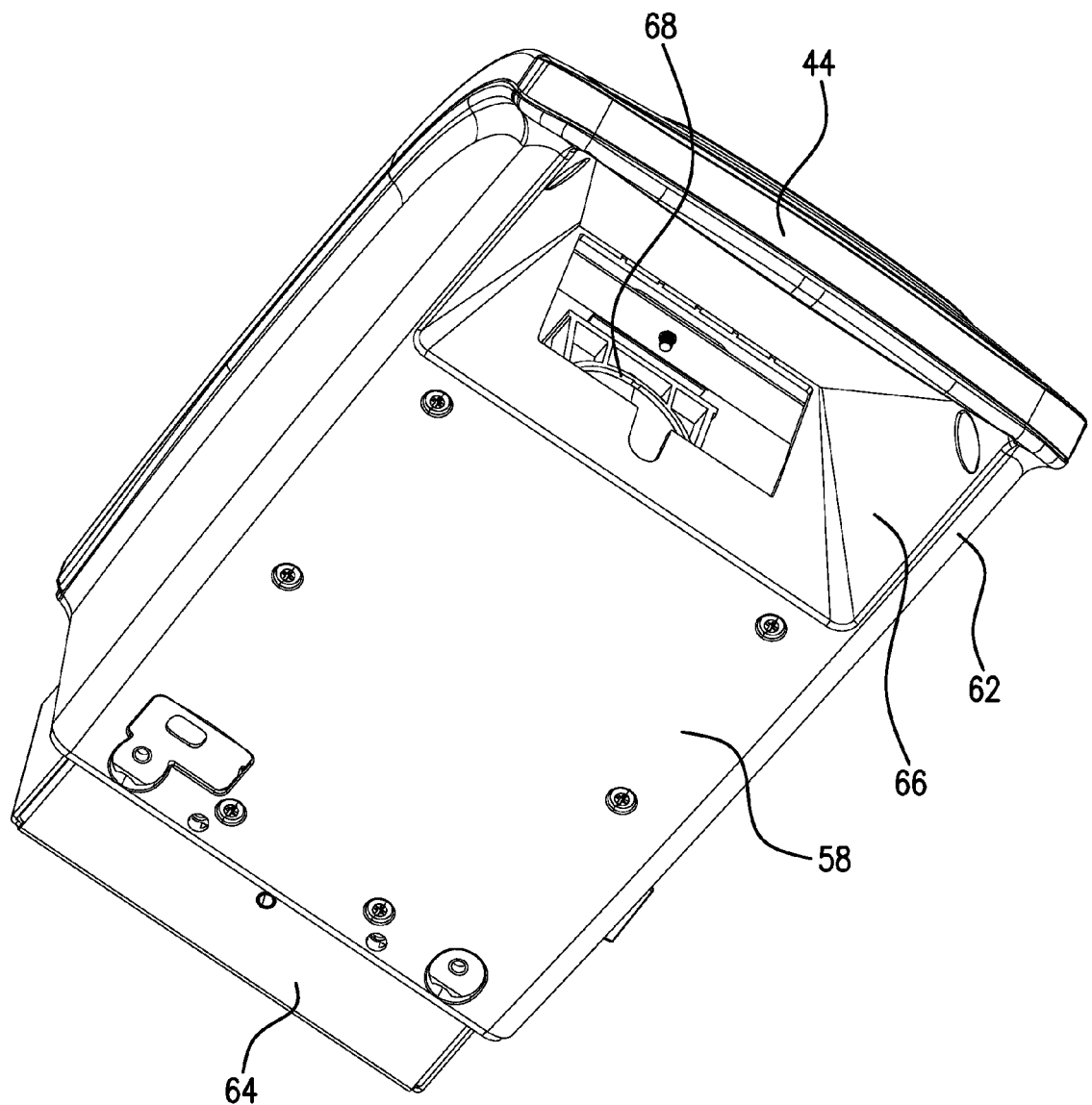
FIG. 12 is a perspective view of the underside of the camera housing of the present disclosure.

When in the fully lowered position of FIG. 9(a), spring 92 is compressed. When in the fully raised position of FIG. 9(b), spring 92 is fully extended. Between this two positions, spring 92 is un-tensioned. Thus, the spring force is used to compensate for the weight of monitor 72. Moreover, such movement is achieved without disturbing or otherwise interfering with the position of camera 68.

Monitor bracket 76 includes a control panel 108 along its lower edge. This control panel 108 ideally includes three individual controls 112 on its forward face. Each of these controls 112(a), 112(b), 112(c) comprises a rotatable outer knob 114 and a centrally positioned push button 116. In each instance, the rotatable outer knob 114 is separate from and operates independent of the center push button 116. Accordingly, outer knob 114 does not operate as a push button, and push button 116 does not operate as a rotatable knob. This eliminates, or greatly reduces, the inadvertent operation of the controls.

First control 112(a) may, for instance, include a rotatable outer knob 114(a) that regulates the brightness of monitor 72 and a center push button 116(a) to turn off/on the lighting. Second control 112(b) may including an outer rotatable knob 112(b) for magnification and a center push button 116(b) for freeze frame. Third control 112(c) may include a rotatable outer knob 114(c) for cycling between various color schemes and a push button 116(c) for operating an associated self-view camera 118. As illustrated, self-view camera 118 can be positioned along an upper edge of monitor 72. This camera 118 allows a user to see close up images of their face, as may be needed for grooming.

Figure 8:
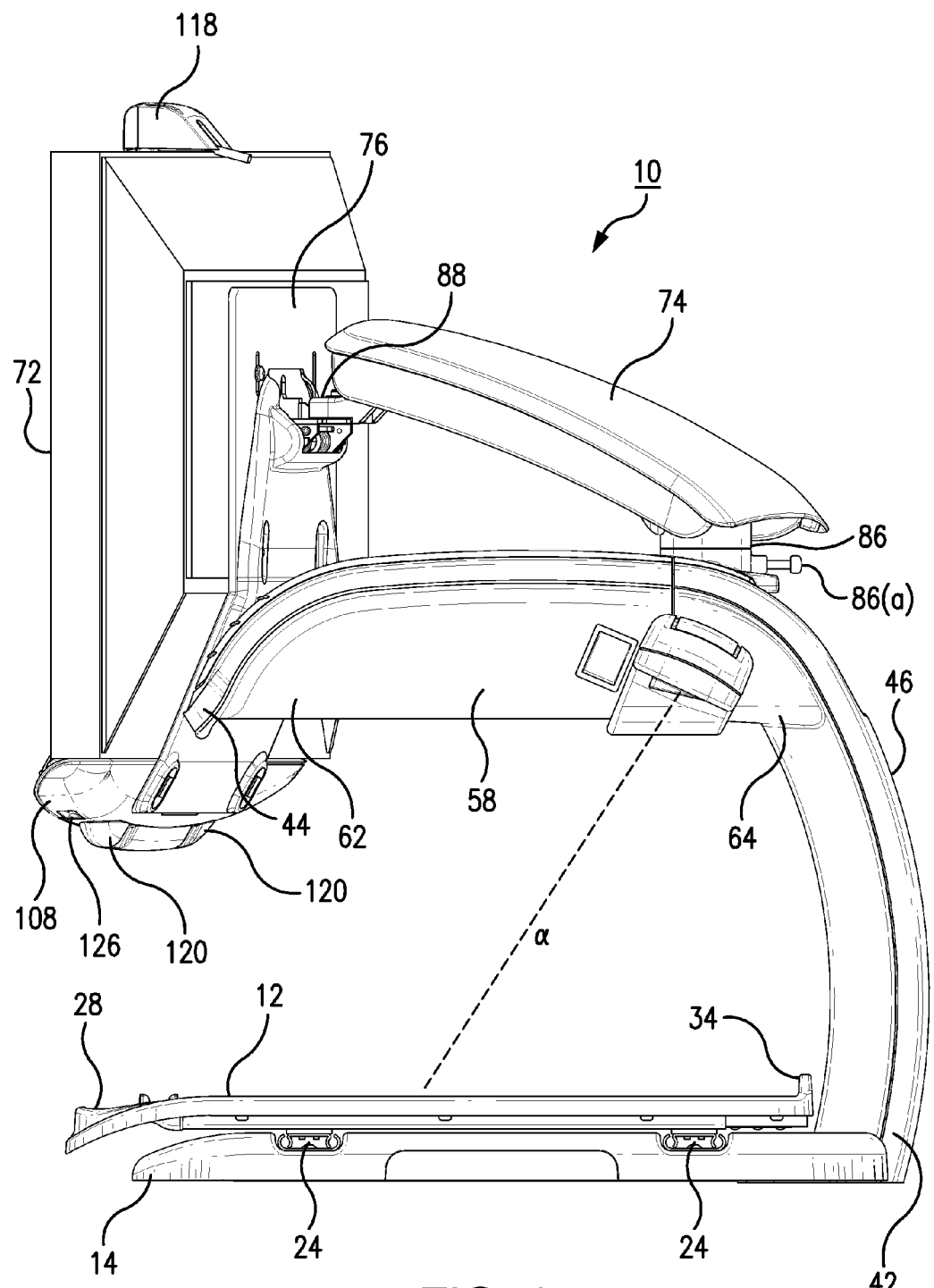
FIG. 8 is a perspective of the magnification device with the monitor arm pivoted with respect to the camera arm.

In the preferred embodiment, two additional controls 120 are likewise included along the bottom edge of control panel 108 (note FIG. 8). Controls 120 are operatively coupled to control panel 108 and can be removed by replacing panel 108. These controls 120 are wheels that can either be rotated or pushed to achieve two different control functions. One of the controls 120 is ideally suited to operate a highlighting feature. This feature allows one or more individual lines of textual material on the screen to be displayed in a different color, or shade, from the remaining items on the screen. The remaining control 120 is ideally suited to operate a blinds feature. With this feature, all areas on the screen are blocked or darkened relative to one or more lines of text. Both the highlighting and blinds feature can be operated by rotating and/or pushing controls 120. Other control function can likewise be assigned to controls 120. A memory card slot 126 is also provided along the bottom edge of control panel 108. This slot can be adapted to receive, for example, SD memory cards. Slot 126 permits software updates to be provided to the operating system. It may also permit still images from camera 68 to be downloaded and stored.

Figure 2:
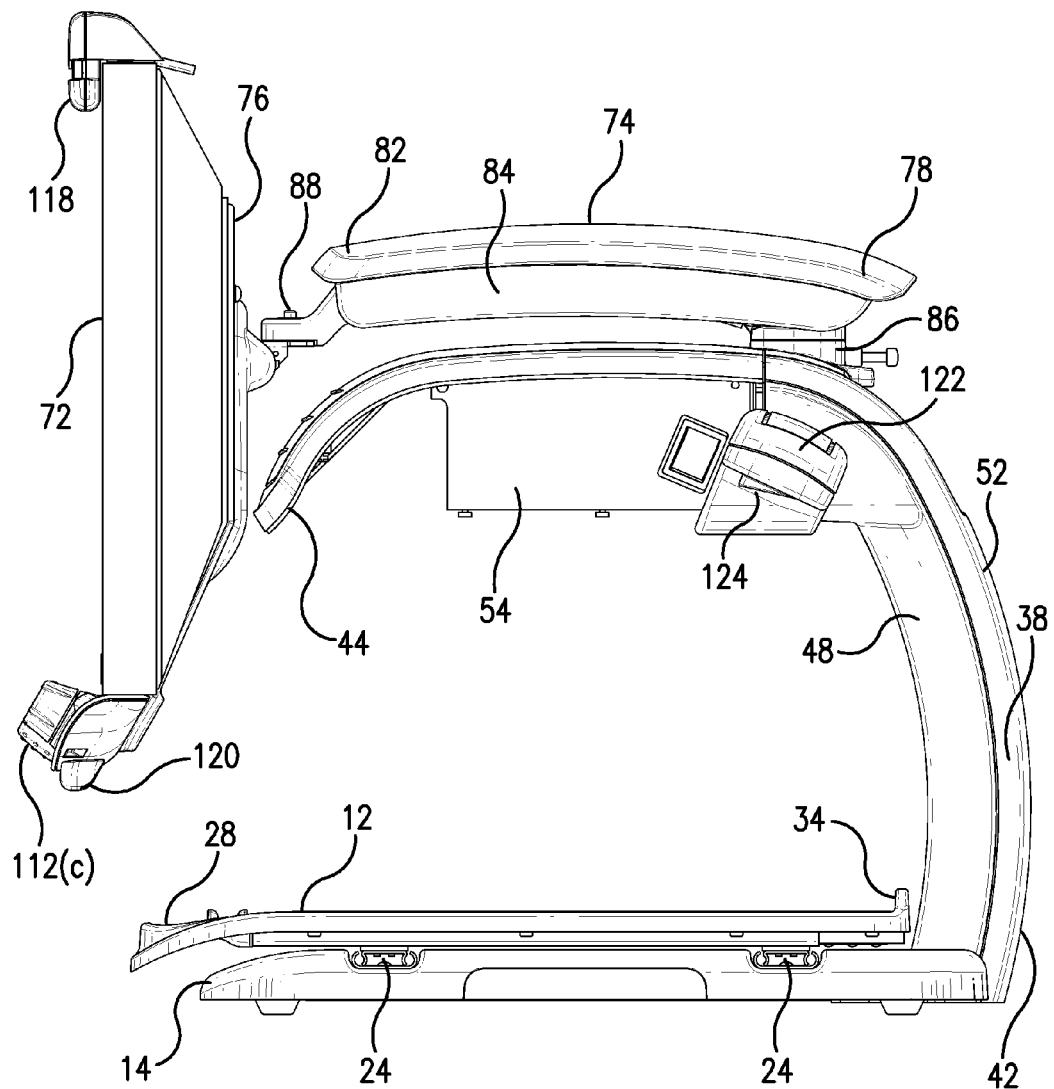
FIG. 2 is a side elevational view of the magnification device of the present disclosure.
Figure 3:
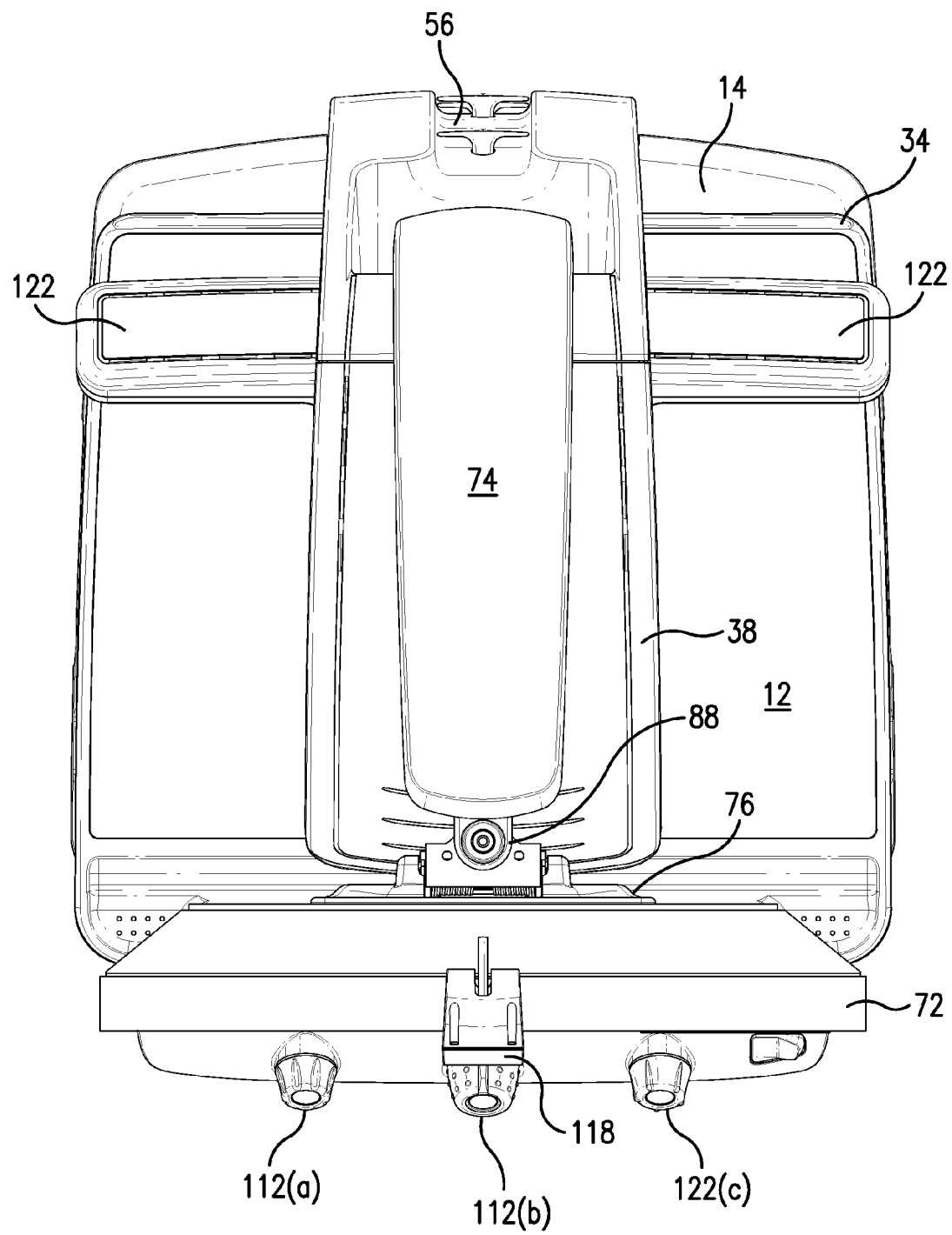
FIG. 3 is a top plan view of the magnification device of the present disclosure.
Figure 4:
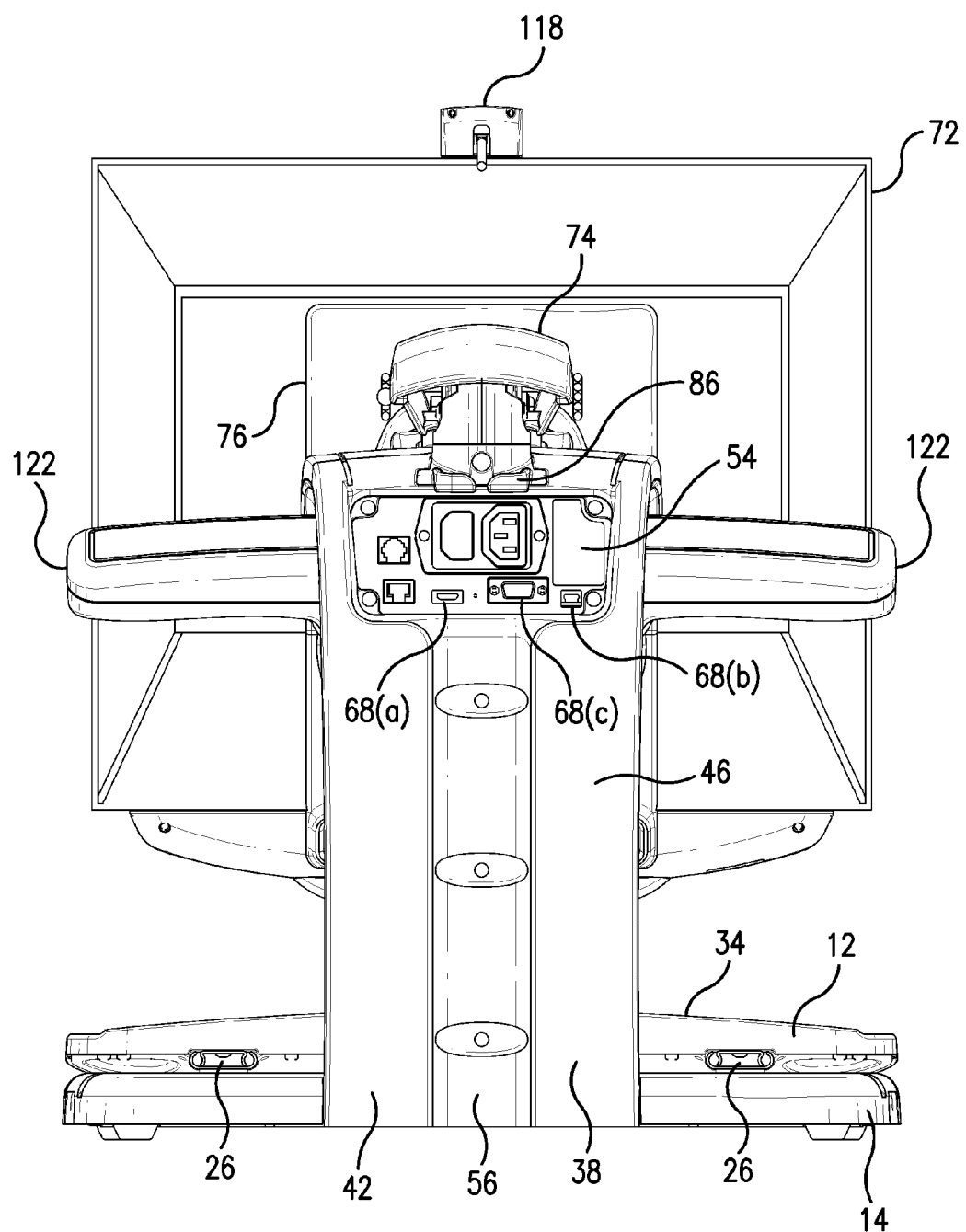
FIG. 4 is a rear elevational view of the magnification device of the present disclosure.
Figure 5:
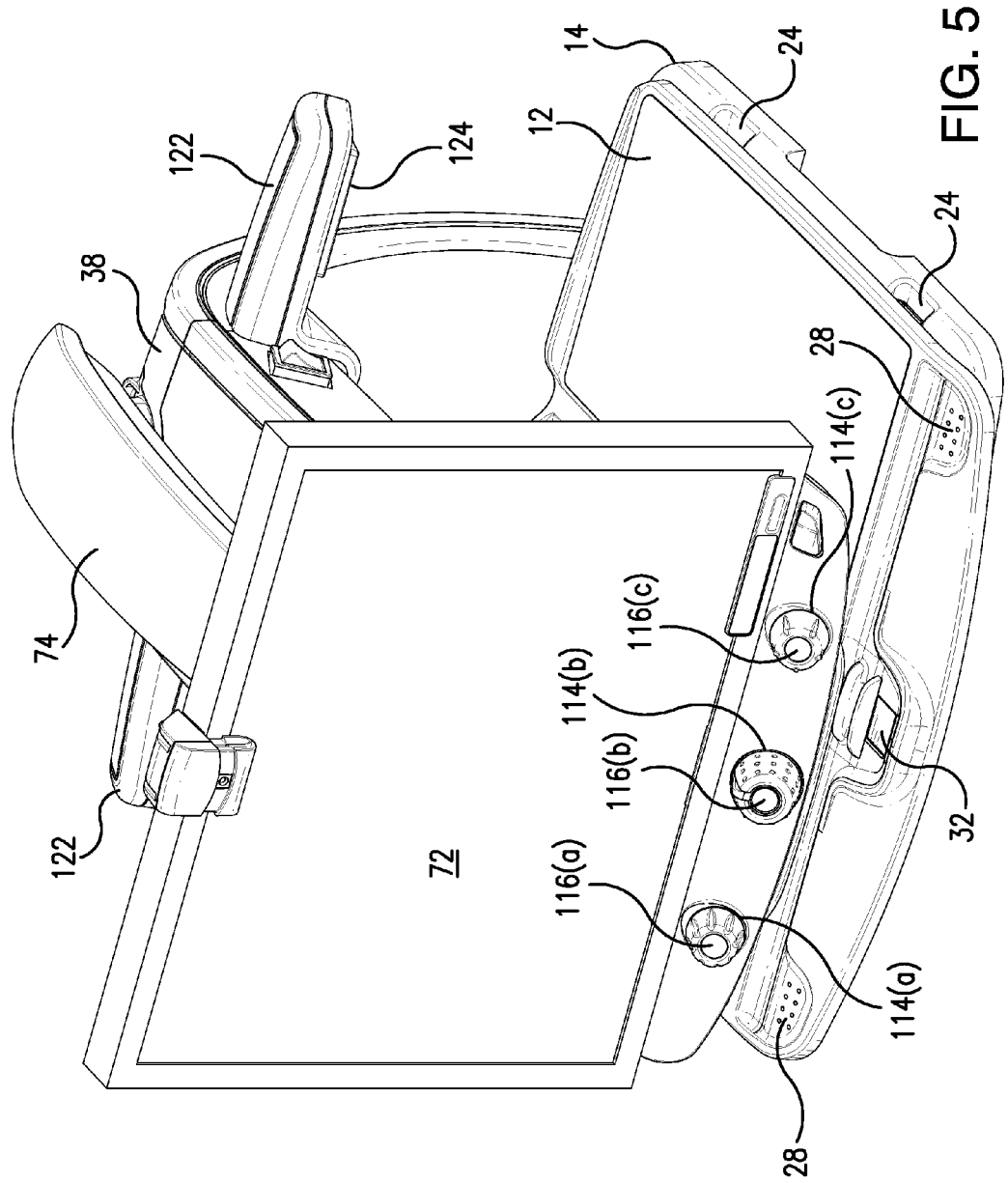
FIG. 5 is a perspective view of the magnification device of the present disclosure.
Figure 6:
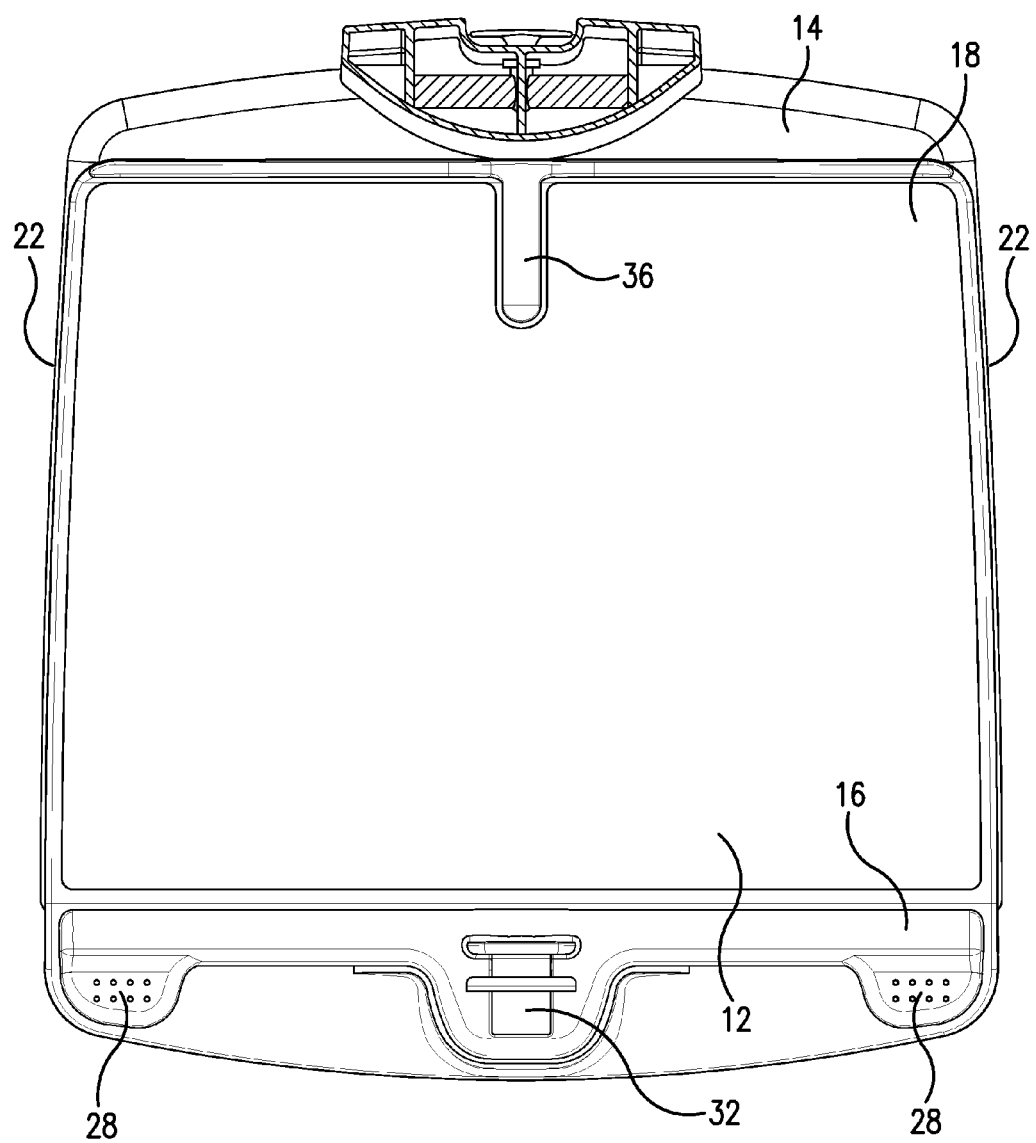
FIG. 6 is a top plan view of the table of the magnification device of the present disclosure.
Figure 7:
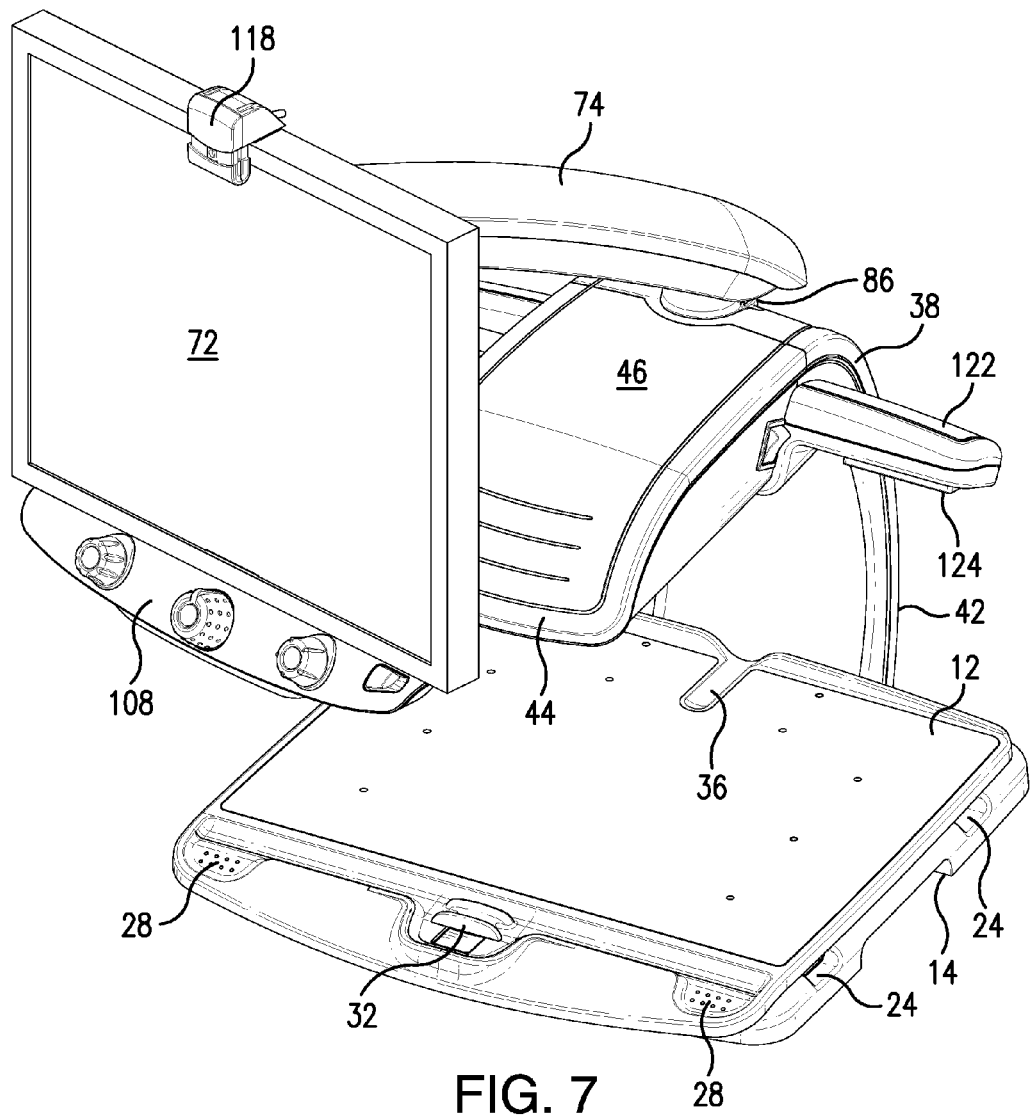
FIG. 7 is a perspective of the magnification device with the monitor arm pivoted with respect to the camera arm.

Appropriate lighting for the entire surface of table 12 is provided by a laterally extending light bridge, or lighting arm 122. The central part of arm 122 is secured to the intermediate extent 46 of camera arm 38 (note FIG. 2). Arm 122 extends at some distance to either side of camera arm 38. The distal ends of arm 122 include housings for supporting a light source, such as a light emitting diode (LED). Lighting arm 122 is orientated at an angle with respect to table 12 to avoid the reflect light from entering camera 68 and causing wash-out. This insures appropriate lighting for objects placed on table 12 and facilitates a larger field of view of the camera. In the preferred embodiment, the center line of the light emanating from the LED impacts at an angle α with respect to the surface of table 12 (note FIG. 8). In the preferred embodiment, this angle is approximately 45.5°. Although the lighting can be orientated at other angles, it has been found that this angle provides optimal lighting for the field of view provided by camera 68.

Alternative Embodiments for Desktop Retainer

A number of alternative embodiments for the desktop retainer are illustrated in connection with FIGS. 13-20. These various embodiments are the same in most respects to the primary embodiment illustrated in FIGS. 1-12. However, in these alternative embodiments different retaining means have been included on the upper surface of the x-y table 12. These retaining means permit objects to be held on the surface of table 12 without sliding or rolling. This, in turn, permits the user to keep both hands free during viewing.

Figure 13A:
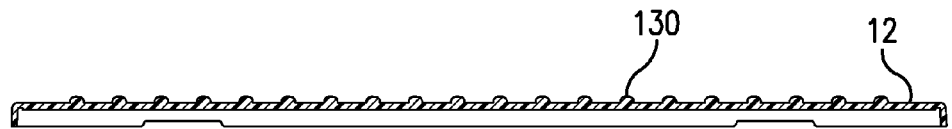
FIG. 13(a) is a profile view of an alternative embodiment of a table for the magnification device.
Figure 13B:
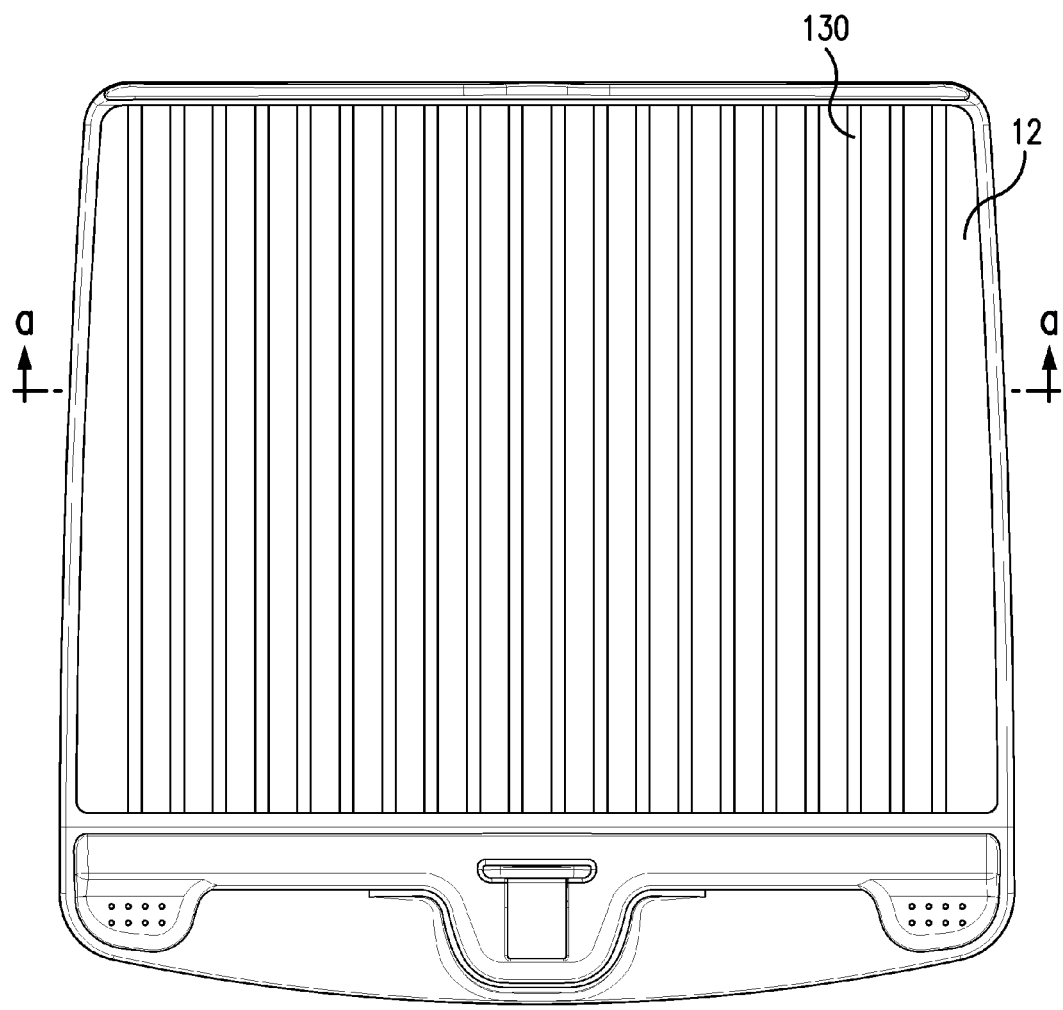
FIG. 13(b) is a top plan view of the table of FIG. 13(a).

In the embodiment of FIGS. 13(a)-13(b), a series of ridges 130 are formed within the x-y table.

Figure 14A:
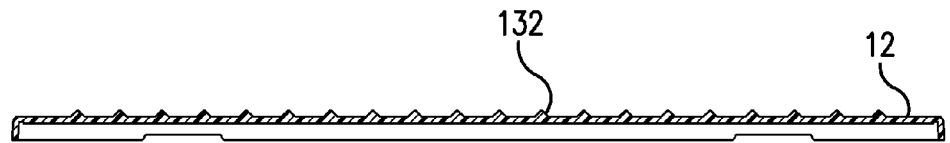
FIG. 14(a) is a profile view of an alternative embodiment of a table for the magnification device.
Figure 14B:
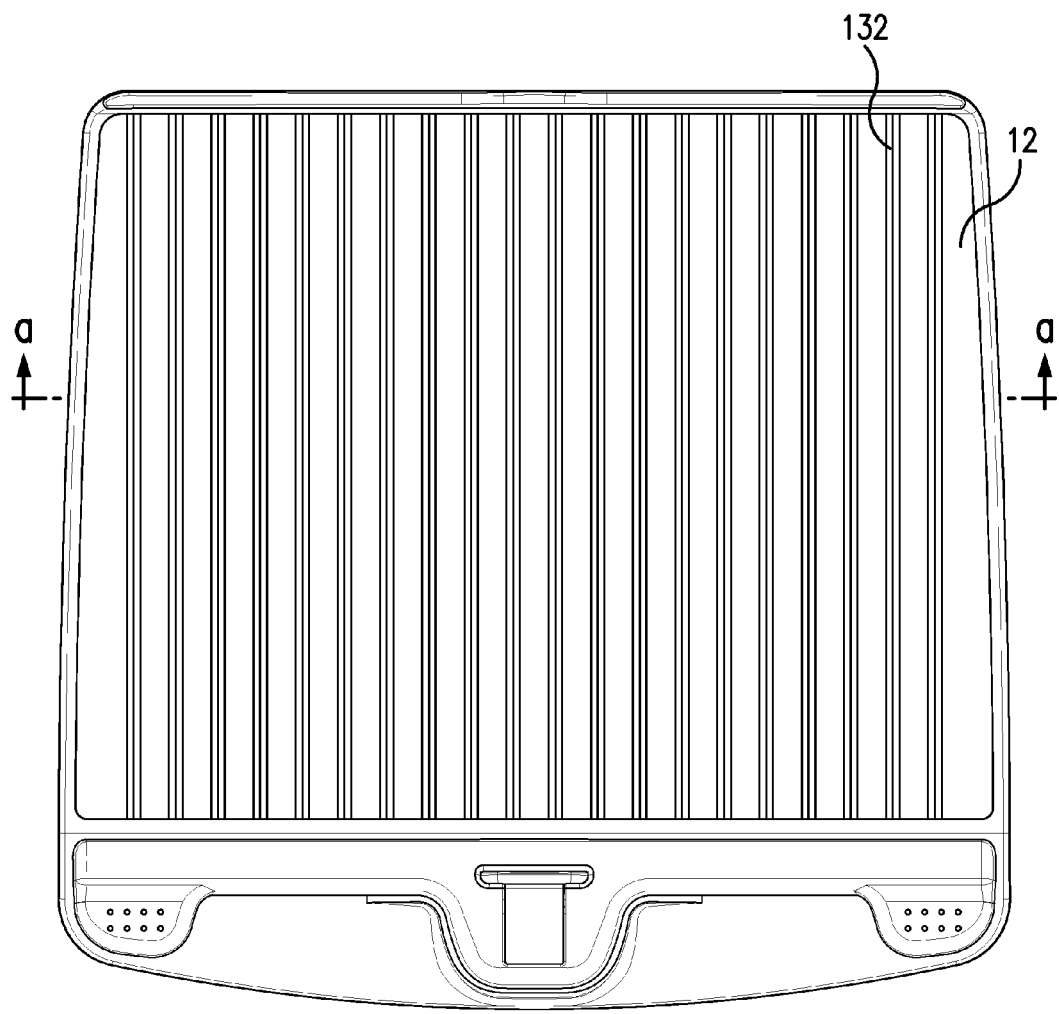
FIG. 14(b) is a top plan view of the table of FIG. 14(a).

These ridges 130, or upwardly extending protuberances, extend from the front edge to the back edge of table 12. A total of 20 ridges are included that span the entire width of table 12. FIG. 13(a) illustrates that these ridges 130 have an arcuate cross-section. However, as illustrated in FIGS. 14(a)-14(b), other ridges 132 can be employed that have an angled cross-section. These embodiments have the benefit of allowing the user to retain an object between a pair of protrusions at a number of locations on the x-y table.

Figure 15A:
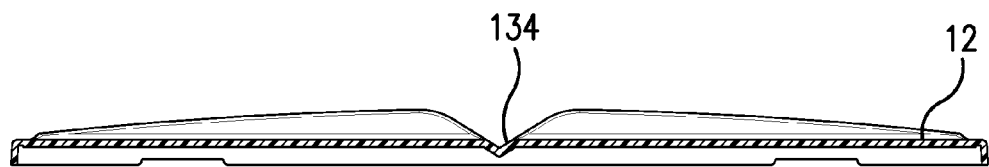
FIG. 15(a) is a profile view of an alternative embodiment of a table for the magnification device.
Figure 15B:
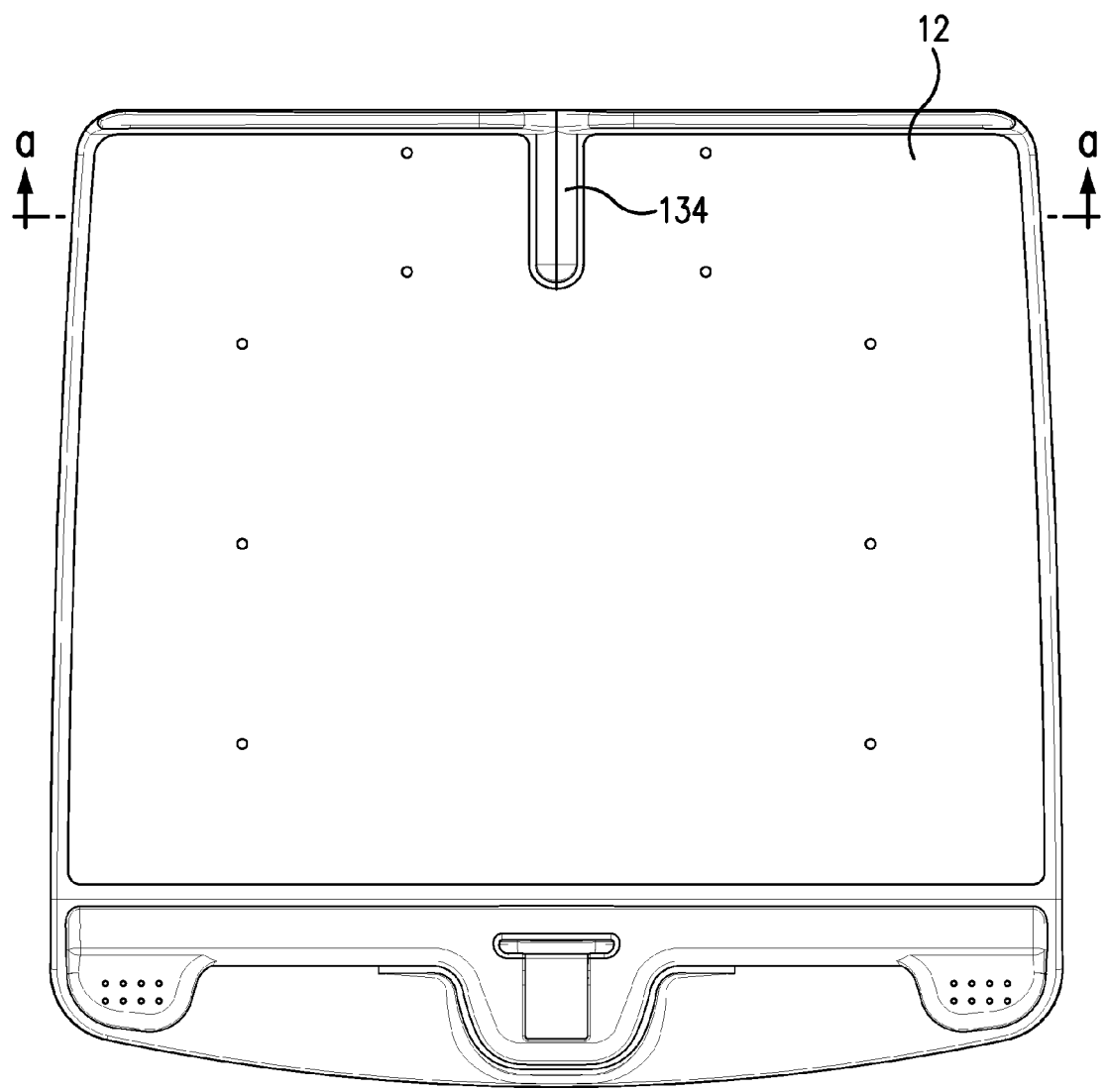
FIG. 15(b) is a top plan view of the table of FIG. 15(a).
Figure 16A:
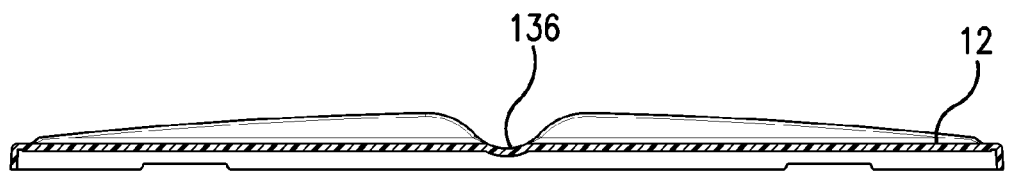
FIG. 16(a) is a profile view of an alternative embodiment of a table for the magnification device.
Figure 16B:
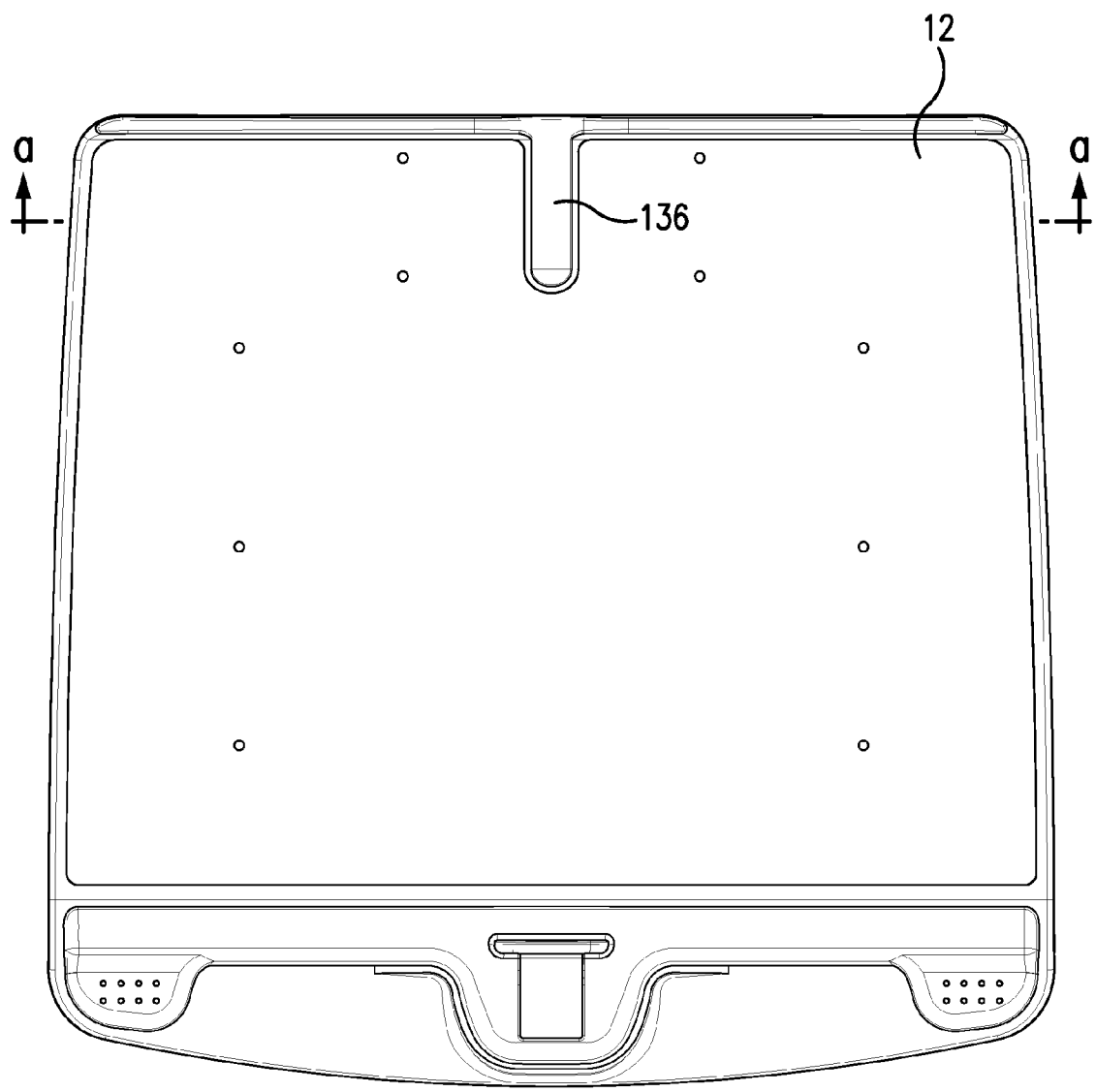
FIG. 16(b) is a top plan view of the table of FIG. 16(a).

The embodiment of FIGS. 15(a)-15(b) includes a single v-shaped recess 134 formed within the surface of the x-y table. Unlike the embodiment of FIGS. 13-14, these recess 134 does not extent between the front and back edges. Instead, recess 134 extends only a small distance from the back edge. The length of recess 134 is generally sufficient to hold smaller cylindrical objects, such as pill bottles. In the embodiment of FIG. 16(a)-16(b), a curved, or arcuate, recess 136 is used in lieu of an angled recess.

Figure 17:
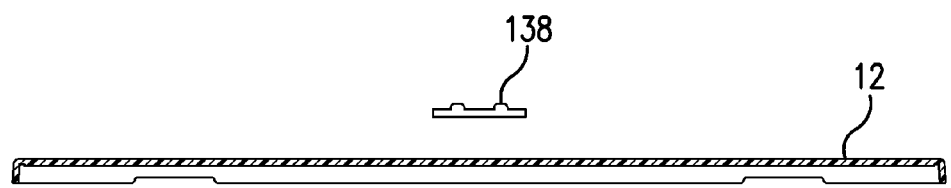
FIG. 17 is a profile view of a removable retainer use in connection with the table of the magnification device.
Figure 18:
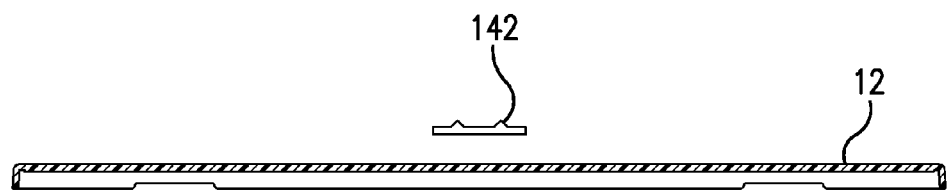
FIG. 18 is a profile view of a removable retainer for use in connection with the table of the magnification device.

In the embodiment of FIGS. 17-18, the retainer (138 or 142) is formed as a separate piece that can be placed anywhere on the surface of the otherwise flat x-y table. This separate retainer can include either arcuate (138) or angled (142) protrusions. These embodiments have the added benefit of allowing a user to position the retained object anywhere on the surface of x-y table. These embodiments also permit the retainer to be removed such that the entire surface of the table 12 to be used for situations where no retainer is needed.

Figure 19A:
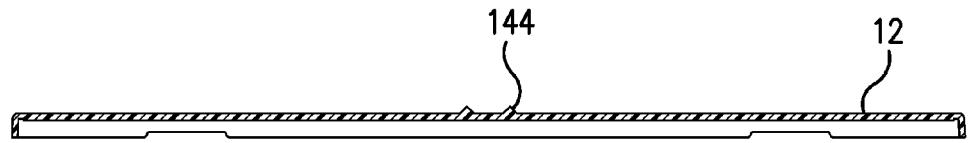
FIG. 19(a) is a profile view of an alternative embodiment of a table for the magnification device.
Figure 19B:
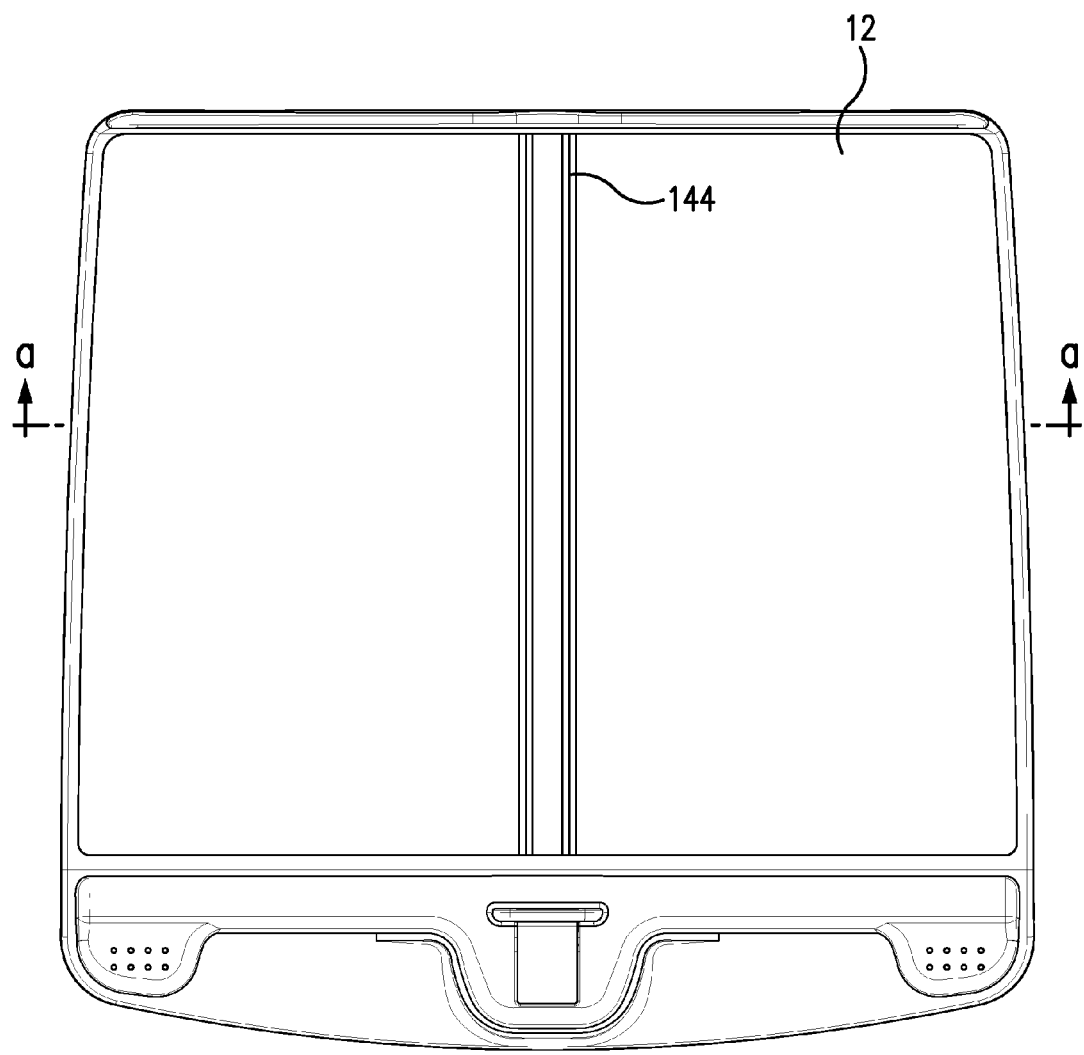
FIG. 19(b) is a top plan view of the table of FIG. 19(a).
Figure 20A:
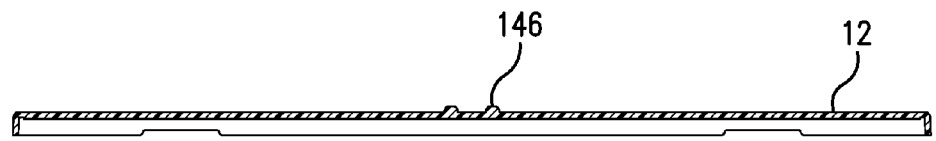
FIG. 20(a) is a profile view of an alternative embodiment of a table for the magnification device.
Figure 20B:
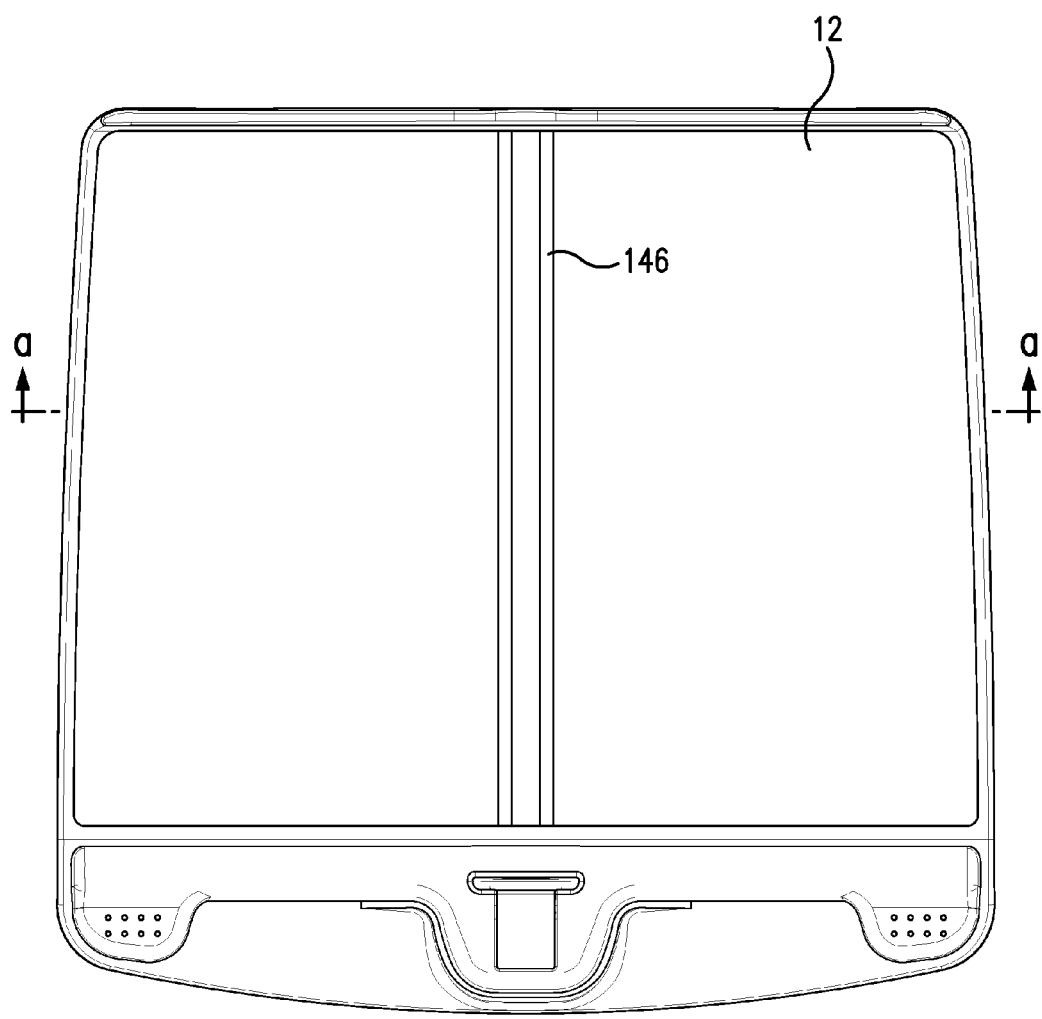
FIG. 20(b) is a top plan view of the table of FIG. 20(a).

Still yet other embodiments are disclosed in FIGS. 19 and 20. In these embodiments, two spaced protrusions are included that extend outwardly from the upper surface of table 12. In each case, the protrusions extend fully from the front to the back edge of the table 12. In the embodiment of FIG. 19, these protuberances 144 are angled. In the embodiment of FIG. 20, these protuberances 146 are arcuate. However, unlike the embodiments of FIGS. 13 and 14, only one set of protrusions are included. Ideally, the pair of protrusions are centered upon the x-y table.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A magnification device for use by blind or low vision users, the magnification device comprising in combination:
   a base having a forward edge, a rearward edge, and side edges therebetween, the base further including a first pair of channels extending between the side edges and a second pair of channels extending between the forward and rearward edges;
   a table having a forward edge, a rearward edge, side edges, and a top surface, the table mounted to the first and second channels of the base to permit the table to be adjusted in the X and Y orientations, the table further including a retaining means for securing objects to the table;
   an arcuate camera arm having a proximal end, a distal end, and forward and rearward surfaces, the proximal end integral with the rearward edge of the base and the distal end extending overtop of the table;
   a monitor arm having a proximal end and a distal end and an intermediate extent therebetween, a counter-balancing spring operatively positioned within the monitor arm, the proximal end of the monitor arm being pivotally connected to the intermediate extent of the camera arm, whereby the monitor arm can be pivoted upward and downward relative to the camera arm;
   a laterally extending lighting arm, the arm interconnected to an intermediate extent of the camera arm, and including a light source at each end for illuminating objects placed on the table.

2. A magnification device for use by blind or low vision users, the magnification device comprising in combination:
   a table having a forward edge, a rearward edge, first and second side edges, and a top surface, the table further including a pair of indentations for retaining objects upon the surface of the table;
   an arcuate camera arm having a proximal end, a distal end, and forward and rearward surfaces, the proximal end integral with the rearward edge of the base and the distal end extending overtop of the table;
   a monitor arm having a proximal end and a distal end and an intermediate extent therebetween, the proximal end of the monitor arm being pivotally connected to the intermediate extent of the camera arm, whereby the monitor arm can be pivoted upward and downward relative to the camera arm;
   a laterally extending lighting arm, the lighting arm interconnected to an intermediate extent of the camera arm, and including a light source for illuminating objects retained on the table;
   a counterbalancing spring operatively secured within the monitor arm.

3. The magnification device as described in claim 2 wherein the indentations extend from the forward to the rearward edge of the table.

4. The magnification device as described in claim 2 wherein the table is an x-y table and wherein a series of indentations are included on the surface of the x-y table such that the indentations extend from the first to the second side edges.

5. A magnification device for use by blind or low vision users, the magnification device comprising in combination:
   a table having a forward edge, a rearward edge, first and second side edges, and a top surface, the table further including a pair of protuberances for retaining objects upon the surface of the table;
   an arcuate camera arm having a proximal end, a distal end, and forward and rearward surfaces, the proximal end integral with the rearward edge of the base and the distal end extending overtop of the table;
   a monitor arm having a proximal end and a distal end and an intermediate extent therebetween, the proximal end of the monitor arm being pivotally connected to the intermediate extent of the camera arm, whereby the monitor arm can be pivoted upward and downward relative to the camera arm;
   a laterally extending lighting arm, the lighting arm interconnected to the camera arm and including a light source for illuminating objects retained on the table;
   a counterbalancing spring operatively secured within the monitor arm.

6. The magnification device as described in claim 5 wherein the protuberances extend from the forward to the rearward edge of the table.

7. The magnification device as described in claim 5 wherein the table is an x-y table and a series of protuberances are included on the surface of the x-y table such that the protuberances extend from the first to the second side edges.

8. The magnification device as described in claim 2 further comprising a control panel removably mounted to the monitor.

9. The magnification device as described in claim 2 wherein the control panel supports a series of controls, with each control having a rotatable knob and a centrally positioned push button.

* * * * *